Aug. 15, 1939  W. F. NIEMEYER  2,169,499

POULTRY ROOST

Filed Nov. 15, 1937

Inventor
Walter F. Niemeyer,
By Minturn & Minturn,
Attorneys

Patented Aug. 15, 1939

2,169,499

UNITED STATES PATENT OFFICE 2,169,499

POULTRY ROOST

Walter F. Niemeyer, Marion County, Ind.

Application November 15, 1937, Serial No. 174,525

1 Claim. (Cl. 119—25)

This invention relates to chicken roosts and has for its primary object the provision of a structure which will provide a vessel to contain a volatile substance whereby the fumes from the substance will be brought into proximity with the chickens or other fowls on the roost as a means for controlling mites, lice, and such vermin.

A further object of the invention is to provide a structure for the above indicated purpose that will automatically increase its action when the roosts are occupied as compared to when they are vacant by utilizing the heat of the chickens to increase vaporization of the chemical employed.

These and other objects of the invention including increased sanitation, convenience in filling and cleaning, and cheapness in construction, will become apparent to those versed in the art in the following description of one particular form of the invention as illustrated in the accompanying drawing, in which—

Figure 2:
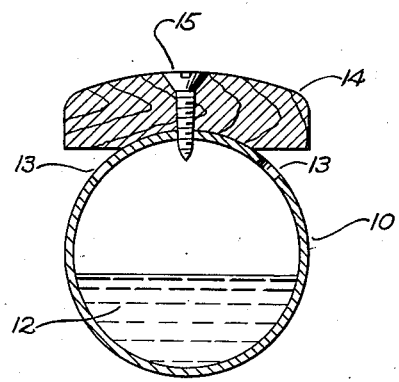
Figure 1:
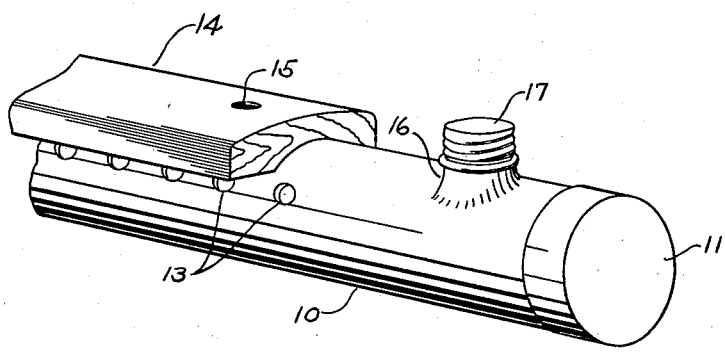

Fig. 1 is a top perspective view of a fragment of a roost bar embodying the invention; and Fig. 2, a transverse section through the bar.

Like characters of reference indicate like parts in the two views in the drawing.

The roost consists essentially of a hollow, tubular bar 10 closed at each end such as by the cap 11 so that a quantity of volatile chemical 12, preferably liquid may be placed in the tube. This chemical may be any of the well known commercially obtainable lice repellants generally a phenol or coal tar derivative such as has heretofore been utilized as a spray or paint around roosts.

The bar 10 is further provided with a series of holes 13 preferably arranged in two spaced apart lines, each equally spaced from the uppermost part of the bar. These holes are located sufficiently high in the bar 10 so fumes coming from the liquid 12 will be discharged upwardly and somewhat outwardly.

In order to prevent otherwise normal filling up of these holes 13 by dirt generally accumulating; a shield strip 14, herein shown as a wood strip is positioned along the top side of the bar 10 and secured thereto in any suitable manner, such as by screws 15. The strip 14 is formed to have sufficient clearance over the holes 13 to permit free escape of the fumes or volatile matter, but the strip overhangs the holes sufficiently to prevent the feet of the poultry from coming in contact with the bar about those holes 13, and also to prevent dirt dropping vertically down thereon. In order to facilitate filling of the bar 10 with the insecticide 12, a filler spout 16 is provided suitably covered with a detachable cap 17.

When the poultry sits on the roost, the feathers drop down over the feet and over the strip 14 out both ways from the bar 10 and the escaping fumes pass upwardly into the lifted or fluffed out feathers in a very effectual manner all during the night. Furthermore, the heat from the poultry warms up the insecticide 12 and thus accelerates the evaporation during the roosting period. The insecticide cools off after the chickens leave the roost and thus the rate of evaporation is reduced.

While I have herein shown and described my invention in the one particular form, it is obvious that structural changes may be employed without departing from the spirit of the invention, and I therefore do not desire to be limited to that form beyond the limitations necessarily imposed by the following claim.

I claim:

A poultry roost comprising a horizontal cylindrical metal tube closed at its ends retaining an insecticide and having a plurality of holes in two parallel rows for escape of insecticide fumes or vapors, and a strip of wood contacting and secured to the tube between but remote from the two rows of holes and projecting laterally thereof at each longitudinal edge to be contacted by and to deflect said fumes, each row of holes being positioned directly below the bottom surface of the strip of wood and out of contact therewith, the portion of the strip of wood between the rows of holes being directly in contact with the exterior surface of the tube between the rows of holes, whereby poultry sitting on the roost supply heat to aid in volatilizing said insecticide in the tube and receive the escaping and deflected volatile matter under the feathers.

WALTER F. NIEMEYER.